United States Patent [19]

Dielhof

[11] Patent Number: 4,742,394
[45] Date of Patent: May 3, 1988

[54] CAMERA FOR RECORDING TELEVISION, PHOTOGRAPHIC OR CINEMATOGRAPHIC IMAGES

[75] Inventor: Pieter B. Dielhof, Eindhoven, Netherlands

[73] Assignee: U.S. Philips Corp., New York, N.Y.

[21] Appl. No.: 903,047

[22] Filed: Sep. 2, 1986

[30] Foreign Application Priority Data

Sep. 4, 1985 [NL] Netherlands .................. 8502419

[51] Int. Cl.$^4$ .................................... H04N 5/335
[52] U.S. Cl. ...................... 358/213.16; 358/213.15; 358/209
[58] Field of Search .............. 358/209, 213.15, 213.16, 358/162

[56] References Cited

U.S. PATENT DOCUMENTS

| | | | |
|---|---|---|---|
| 3,824,337 | 7/1974 | Sangster | 358/213.15 |
| 4,167,755 | 9/1979 | Nagumo | 358/213.16 |
| 4,475,125 | 10/1984 | Esser | 358/162 |

*Primary Examiner*—Michael A. Masinick
*Attorney, Agent, or Firm*—Jack E. Haken

[57] ABSTRACT

A camera formed with a solid-state image sensor (FTD) comprising a pick-up member (I), a storage member (M) and a shift register member (SR) with three output shift registers (SR1, SR2, SR3). The picture signals (S1, S2, S3) originating from the output registers must be combined in a monochrome camera or a color camera with the aid of several image sensors to a balanced composite picture signal (S123). To this end the camera comprises two control systems for fixing one and the same black level in the three picture signals. Three clamping circuits precede a signal combination circuit (11), two clamping circuits (2, 3) and one (4) operating at a control voltage (V1, V2) and a reference voltage (Vref), respectively. The two control systems (18, 22, 26, 2) and (19, 23, 27, 3) succeed the circuit (11), each system being formed with multiplier circuits (18, 19) for the supply of the picture signal (S123) and a clock pulse signal (CP1, CP2) associated with the relevant register (SR1, SR2). When the dark current information originating from below a dark strip (B) occurs, each multiplier circuit (18, 19) is connected via switching circuits (22, 23) controlled by a black gating pulse signal (GBP) to a storage circuit (26, 27) for the supply of the control voltage (V1, V2).

9 Claims, 2 Drawing Sheets

CAMERA FOR RECORDING TELEVISION, PHOTOGRAPHIC OR CINEMATOGRAPHIC IMAGES

BACKGROUND OF THE INVENTION

The invention relates to a camera for recording television photographic or cinematographic images. The camera includes a solid-state image sensor in the form of a charge transfer device comprising a pick-up member, a storage member and a parallel-in, series-out shift register member having at least two output shift registers each being coupled to a distinct sensor output terminal. The storage and shift register members are shielded from incident light. The pick-up member is shielded from incident light over a strip.

The image sensor in the camera is operative under the control of a signal generator for supplying clock pulse signals for obtaining a picture signal having a periodical picture information associated with a scene to be recorded and a periodical dark current information originating from below the said strip and being associated with a signal black level. The picture signal is obtained after a picture information integration period in the pick-up member and a charge transfer period for the transfer between pick-up member and storage member.

A camera of this type, particularly for television, has been described in an English language technical publication no. 150, of the Philips Electronic Components and Materials Division, issued on Jan. 11, 1985, in which the solid-state image sensor is a so-called frame-transfer sensor which is mentioned as an attractive alternative to the television camera tube. The shift register member has three parallel shift registers which in case of a colour recording based on three primary colours each apply a picture signal corresponding to a given colour to one of the three output terminals. For this purpose construction of the image sensor is available with a colour strip filter placed in front of it. Another construction without a colour strip filter is suitable for use in black/white recording or a colour recording with several image sensors. The dark current information originating from below the said shielding strip in the pick-up member occurs in all three picture signals, independent of the construction.

When the described image sensor is used in a black/white or monochrome camera or in a colour camera having more than one image sensor, for example, three, the picture signals originating from the three output shift registers and occurring at the three output terminals of the image sensor are to be combined to one composite camera picture signal. The use of three output shift registers in the image sensor provides the advantage in production that one and the same image sensor construction can be used for both black/white recording and colour recording with one image sensor, apart from the additional provision of the colour strip filter. In addition there is the advantage of the higher pixel density in the television line scan (i.e. the horizontal direction) than in the case of the use of a single output shift register. In fact, the limited minimum width of the control electrodes in the image sensors imposes a limit on the minimum horizontal distance between charge packets in the image sensor and this distance is reduced by a factor of three when three shift registers are used.

With the two advantages described there is the problem in the monochrome camera or the colour camera having several image sensors that the contributions of the picture signals originating from each of the three output shift registers to the composite camera picture signal should be equally large. Scene pixels having the same information content must occur in the camera picture signal with more or less the same signal value between black level and peak white level. In practice especially differences between the black levels in the three picture signals originating from the shift registers are found to be inadmissible so that no balanced composite picture signal can result without any further measures. Upon display of such an unbalanced composite picture signal a troublesome interference pattern of vertical stripes is found to occur.

SUMMARY OF THE INVENTION

It is an object of the invention to realize a camera in which the composition of at least two picture signals originating from separate shift registers of an image sensor leads to a balanced composite camera picture signal. To this end a camera according to the invention is characterized in that of the sensor output terminals carrying the picture signals one output terminal is coupled via an associated clamping circuit operating at a reference voltage and at least one further output terminal is coupled via an associated clamping circuit operating at a control voltage to an input of a signal combination circuit having an output for the supply of a composite picture signal. The output is coupled to a first input of a signal multiplier circuit having a second input for the supply from the signal generator of the clock pulse signal which is associated with the output shift register which is coupled via the sensor output terminal to the clamping circuit operating at a control voltage. The output of the signal multiplier circuit is coupled to a control voltage input of the said clamping circuit operating at a control voltage via a switching circuit having a switching input for the supply of a black gating pulse signal associated with the periodical dark current information, and a subsequent signal storage circuit.

The invention is based on the recognition that a balanced composite camera picture signal can be obtained by carrying out a phase measurement at this signal after the combination of the separately obtained picture signal comprising inequalities corresponding to a black level interference signal, whereafter such a correction is performed that the interference signal becomes minimum. In this case there is a relative measurement at the interference signal so that the totality of preceding signal distortions caused in the output shift register, the clamping circuit and the signal combination circuit is corrected.

A further embodiment of a camera having a specifically built image sensor is characterized in that in the presence of an image sensor having three output shift registers the camera is provided with two clamping circuits operating at a control voltage whose control voltage inputs are each coupled to an associated signal multiplier circuit, switching circuit and signal storage circuit.

An embodiment of a camera in which inter alia the black level interference signal is present without any harmonics of a relevant interference frequency is characterized in that the output of the signal combination circuit is coupled to the first input of the signal multiplier circuit via a low-pass filter having a filter characteristic of up to the order of one and a half times the clock pulse frequency of the said clock pulse signal.

An embodiment of a camera in which the black level interference signal to be processed in the signal multiplier circuit has an optimum structure is characterized in that the output of the signal combination circuit is coupled to the first input of the signal multiplier circuit via a signal amplifier circuit having a signal limiter and a phase shifter.

A further embodiment in which the signal amplifier circuit is safeguarded from overdrive is characterized in that the output of the signal combination circuit is coupled via a switching circuit to the signal amplifier circuit, said switching circuit having a switching input for the supply of the black gating pulse signal associated with the periodical dark current information.

BRIEF DESCRIPTION OF THE DRAWING

The invention will be described in greater detail by way of example with reference to the accompanying drawing, in which.

DESCRIPTION OF THE PREFERRED EMBODIMENTS

Figure 1:
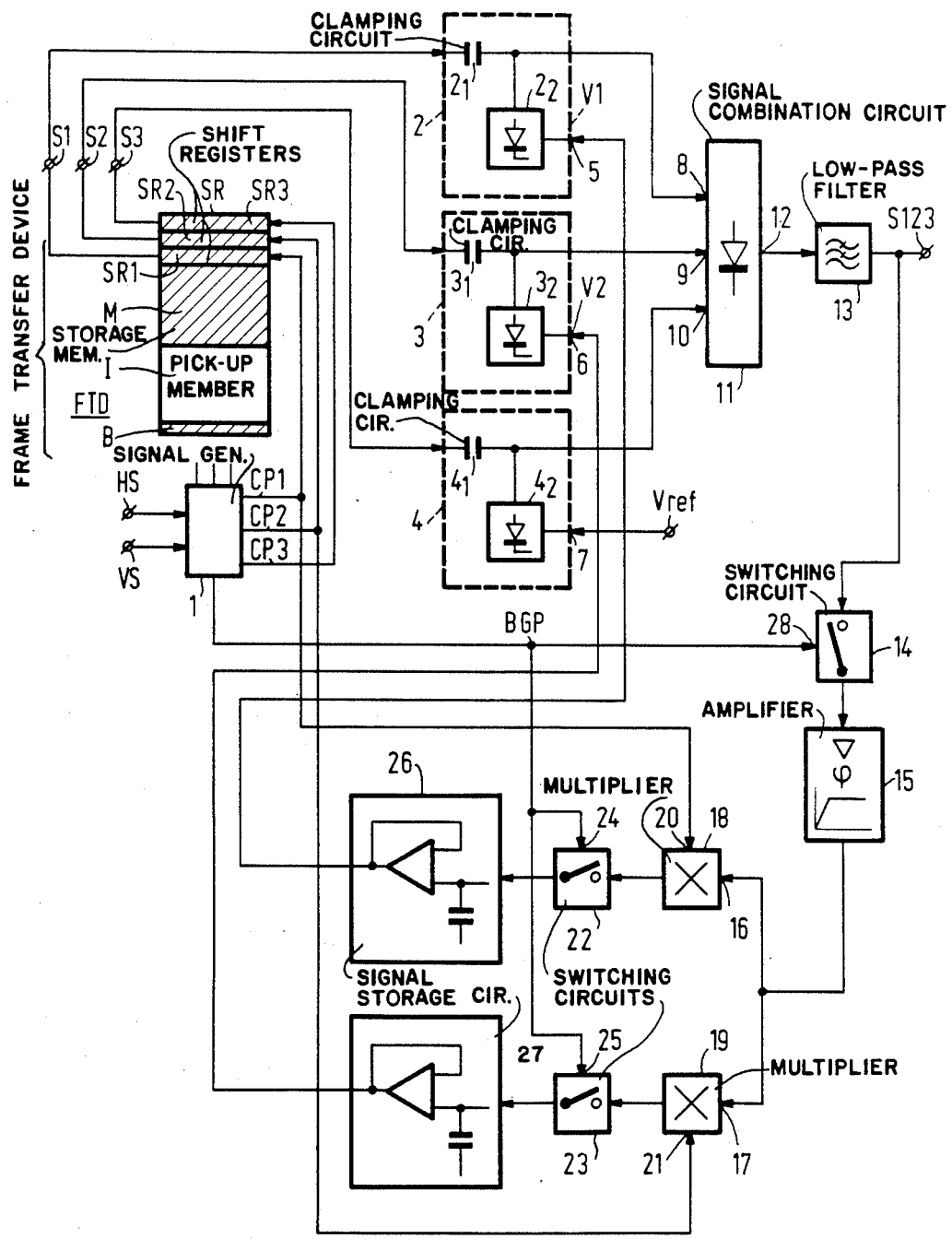
FIG. 1 is a block diagram of an embodiment of a camera according to the invention.

In the camera according to the invention which is shown in a block diagram in FIG. 1, the reference FTD denotes a solid-state image sensor which, as is illustrated by means of a block diagram, is in the form of a charge transfer device, more specifically as what is commonly referred to as a Frame Transfer Device. The sensor FTD is in the form of an integrated circuit comprising a pick-up member I, an adjacent storage member M which is shielded from light and adjacent thereto a parallel-in series-out shift register member SR which is also shielded from light and has three output shift registers SR1, SR2 and SR3. The light shields are shaded in FIG. 1 in which furthermore the pick-up member I is provided with a strip-shaped shield B. The construction and the operation under the control of clock pulse signals to be applied is described in detail in the said publication and in U.S. Pat. No. 3,824,337 which is included herein by reference. The pick-up member I and the storage member M are constructed from pick-up and storage elements, respectively, which are arranged in rows and columns, a charge transfer occurring periodically in the column direction in the members I and M and between them.

According to the publication the storage member M and the pick-up member I comprise 294 rows of storage and pick-up elements. Light originating from a scene to be recorded is converted in the pick-up member I during a picture information integration period into charge packets which reach one of the three output shift registers SR1, SR2 and SR3 after a charge transfer period via the storage member M. According to the said publication three rows of elements are present in the member I under the strip B. These three rows of elements may serve for a dark current measurement and an associated black level clamping.

Instead of the described construction of the sensor FTD with the adjacent members I, M and SR, a storage member arranged in the integrated circuit under the pick-up member I may be used. In this situation it should be ensured that light incident on the pick-up member I does not reach the storage member and the shift register member. The pick-up member I then ensures the shield against light. The charge transfer from the pick-up member I to the storage member can now be effected directly from each pick-up element to the subjacent storage element, whereafter the charge transfer can be effected in the column direction in the storage member to the shift register member.

A further example of a construction of an image sensor is that in which the shift register member is in the form of the base of a comb which is shielded from light and whose teeth constitute the storage member. The pick-up elements of the pick-up member are arranged in columns between the teeth of the storage member. In this example the pick-up elements may also have a direct charge transfer to the adjacent associated storage elements. A sensor having such a construction is sometimes referred to as an interline transfer device.

For another example of the construction of an image sensor having various output shift registers reference is made to U.S. Pat. No. 4,475,125. The sensor described is operative in the semiconductor body with an information flow of electrons and an information flow of holes, while the two information flows become separately available at two output terminals via two output shift registers.

Independent of the specific construction of the image sensor it is assumed that a black/white or monochrome camera or a colour camera provided with several image sensors has at least one image sensor provided with at least two output shift registers, with the specific sensor FTD having three shift registers SR1, SR2 and SR3 shown as an example in FIG. 1. In FIG. 1 the sensor FTD is shown without the control circuits required for the pick-up member I and the storage member M for which reference is made to the said publication. Under the control of clock pulse signals CP1, CP2 and CP3, picture signals S1, S2 and S3 become available at sensor output terminals designated by the same references and which are connected to the respective shift registers SR1, SR2 and SR3. Supply voltages for the sensor FTD and for further components in the camera according to FIG. 1 have not been shown for the sake of simplicity. Furthermore connection leads have been shown as single wires for the sake of simplicity, but they may be alternatively of a multiple design in practice and independent thereof they may comprise signal processing circuits.

In the camera of FIG. 1 the picture signals S1, S2 and S3 occurring at the output terminals shown next to them are to be combined in a balanced manner to form a composite camera picture signal S123 occurring at a camera output terminal having the same reference. In the case in which the camera picture signal S123, after having been submitted to further signal processing operations which are customary in television, is used for television reproduction, the camera shown in FIG. 1 operates as a black/white or monochrome television camera. Another possiblity is to process the camera picture signal S123 into a signal suitable for cinefilm reproduction so that the camera shown in FIG. 1 forms part of a cinefilm camera as a pick-up member. A further possibility is to process the camera picture signal S123 to form a photograph or a slide so that the camera of FIG. 1 forms part of a photographic camera as its pick-up member. A camera having several image sensors may be operative for colour recording or for three-dimensional recording.

Independent of the specific camera construction it is required in all cases to compose the picture signal S123 in a balanced manner, that is to say, the picture signals S1, S2 and S3 occurring at the sensor output terminals have more or less the same picture signal value for one and the same scene information content of a pixel. For this purpose it is essential that the picture signals S1, S2 and S3 for the black information give one and the same signal value in the composite camera picture signal S123.

Figure 2:
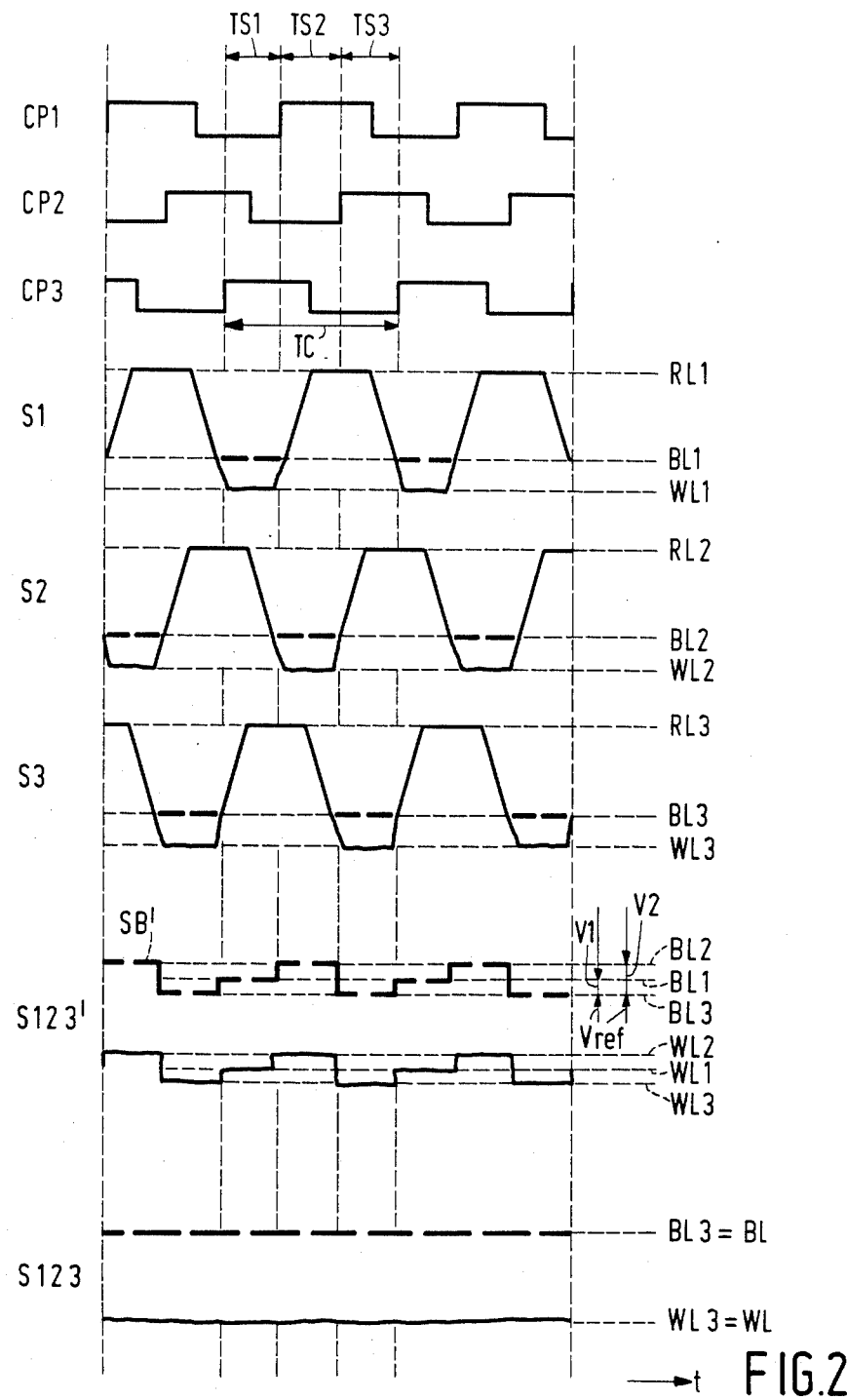
FIG. 2 shows some signal diagrams as a function of time to illustrate the operation of the camera of FIG. 1.

For the further description of the camera according to FIG. 1 reference is made to FIG. 2 to illustrate the camera operation. FIG. 2 shows signal diagrams plotted as a function of time t. The diagrams are also shown for the clock pulse signals CP1, CP2 and CP3 supplied by the signal generator 1 of FIG. 1. The signals CP1, CP2 and CP3 are three clock pulse signals shifted over 120° a clock pulse period of which is denoted by TC at the signal CP3. Starting from a clock pulse frequency FCP=1/TC=3.75 MHz, a period TC=266.7 ns follows. Next to the signal CP1 there are indicated periods TS1, TS2 and TS3 occurring during the period TC, which will appear to be pixel periods TS. For the pixel period there applies that TS=88.9 ns and for a pixel frequency there applies that FS=11.25 MHz.

FIG. 1 shows that the signal generator 1 supplies a signal BGP which will appear to be operating as a black gating pulse signal for change-over circuits. Further output connections of the generator 1 are shown as being non-interconnected.

According to FIG. 1 signals HS and VS are applied to the generator 1 via terminals. When used as a television camera or as a scene recording part of a television camera, the signals HS and VS are line and field synchronising signals, respectively.

The image sensor FTD is operated in known manner, for which it holds that the black gating pulse signal BGP occurs when the dark current information originating from below the strip B in the signals S1, S2 and S3 and hence in the signal S123 is available for processing. The dark current information of the central one of the three sensor element rows below the strip B is processed as an example, the image sensor FTD operating or not operating in accordance with an interlaced television system.

In FIG. 2 signal voltage diagrams S1, S2 and S3 are plotted as they occur due to the charge packet structure and processing. Starting from a reset level (RL) a signal value, dependent on the local pixel information, occurs between a black level (BL) and a peak white level (WL). In FIG. 2 the reference numerals 1, 2 and 3 indicate that these levels have a different value in the various signals S1, S2 and S3. It is mentioned as an example that the voltage difference between the levels RL1 and BL1, RL2 and BL2 and RL3 and BL3 is on the order of 1.5 V. The picture signal S1, S2 or S3 may then have a voltage of 0.3 V between the black information and peak white. According to FIG. 2 the pixel periods TS1, TS2 and TS3 are associated with the respective picture signals S1, S2 and S3.

According to FIG. 1 the picture signals S1, S2 and S3 occurring at the image sensor output terminals are applied to clamping circuits 2, 3 and 4, respectively. The circuits 2, 3 and 4 may be identical, but the clamping circuits 2 and 3 operate at control voltages V1 and V2, respectively, and the clamping circuit 4 operates at a reference voltage Vref. The control voltages V1 and V2 are applied to control voltage inputs 5 and 6, respectively. The clamping circuit 4 has an input 7 to which the adjustable or non-adjustable reference voltage Vref is applied via a terminal. The clamping circuits 2, 3 and 4 are diagrammatically shown in FIG. 1 each having a separating capacitor $2_1$, $3_1$ or $4_1$ and a subsequent clamping device $2_2$, $3_2$ or $4_2$. The clamping devices $2_2$, $3_2$ and $4_2$ are shown with diodes for the sake of simplicity, but they may also be formed with transistors, amplifier circuits etc.

The clamping circuits 2, 3 and 4 are succeeded by inputs 8, 9 and 10 of a signal combination circuit 11 having an output 12 for the supply of a composite picture signal. The circuit 12 is shown as an example with a diode so as to illustrate that the lowest signal value is each time present at one of the inputs 8, 9 and 10, present at the output 12. The output 12 is coupled via a low-pass filter 13 to the output terminal of the camera at which the composite camera picture signal S123 occurs.

The circuit 11 may be formed with three diodes or with transistors for performing the signal combination. A comparison of the conductivity directions shown of the diodes in the devices $2_2$, and $3_2$ and $4_2$ with that of the diode in the circuit 12 shows that the lowest signal value is passed on after three times of peak rectification.

If no further measures according to the invention are taken, a unbalanced composite camera picture signal is produced by S123' in FIG. 2. The signals 123' is derived from the signals S1, S2 and S3 shown in FIG. 2. The black levels BL1, BL2 and BL3 are now shown in their mutual relation-ship, the black level BL1 being located as an example between the black levels BL2 and BL3. Starting from one and the same peak-white information for the three picture signals S1, S2 and S3, the shown variation for the peak white level follows with the values WL1, WL2 and WL3. In the unbalanced composite camera picture signal S123' the reference SB' indicates a black level interference signal occuring at the output 12 when the dark current information becomes available which originates from below the strip B of the image sensor FTD, more specifically from the central one of the three element rows.

The interference information present in the black level interference signal SB' is utilized according to the invention for controlling the black level variation to a minimum via a control system. To this end the output of the filter 13 is coupled via a switching circuit 14 in series with a signal amplifier circuit 15 to first inputs 16 and 17 of signal multiplier circuits 18 and 19, respectively, having second inputs 20 and 21, respectively, which are coupled to the output of the signal generator 1 at which the clock pulse signals CP1 and CP2, respectively, occur.

The outputs of the circuits 18 and 19 are coupled to inputs of switching circuits 22 and 23, respectively, formed with switching inputs 24 and 25, respectively, to which the black gating pulse signal BGP originating from the signal generator 1 is applied. The outputs of the circuits 22 and 23 are coupled via signal storage circuits 26 and 27, respectively, to inputs 5 and 6 of the clamping circuits 2 and 3, respectively, operating at a control voltage.

The storage circuits 26 and 27 are each shown with a signal-integrating capacitor and a buffer amplifier. The combination of the switching circuits 22 and 23 and the storage circuit formed as signal-integrating and buffer circuits 26 and 27, respectively, may be further described as a signal sample-and-hold circuit. The gating pulse signal BGP is also applied to a switching input 28 of the switching circuit 14, which is advantageous as will be described hereinafter.

Components which are essential for the operation of the camera of FIG. 1 are the series arrangements (18, 22, 26) and (19, 23, 27). For the series arrangement (18, 22, 26), the clamping circuit 2 receives the control voltage V1 upon supply of the black level interference signal SB' (of FIG. 2), the clock pulse signal CP1 associated with the output shift register SR1, which is coupled to the clamping circuit 2, and the black gating pulse signal BGP associated with the periodical dark current information. This control voltage V1 is plotted next to the signal S123' in FIG. 2 as a measure of the voltage between the levels BL1 and BL3 (Vref), which voltage is set back to a minimum measuring value. A similar reasoning applies to the series arrangement (19, 23, 27) in co-operation with the clamping circuit 3, which is illustrated in FIG. 2 by the control voltage V2 associated with the voltage between the levels BL2 and BL3. FIG. 2 shows the result in the balanced composite camera picture signal S123 which has (substantially) one and the same black level BL3=BL in which one peak white level WL3=WL is present.

The black level interference signal SB', an example of which is shown in FIG. 2 is controlled to a minimum interference signal with the aid of two control systems (18, 22, 26, 2) and (19, 23, 27, 3). In this control to a minimum the signal multiplication of the black level interference signal SB' by the clock pulse signals CP1 and CP2, respectively, associated with the intercoupled shift registers SR1 and SR2 and clamping circuits 2 and 3 corresponds to a phase measurement. Its result, which is stored in the storage circuits 26 and 27, produces such a correction via the control voltages V1 and V2 in the clamping circuits 2 and 3, respectively, that the interference signal becomes minimum.

In the embodiment of the camera shown in FIG. 1 there are three output shift registers SR1, SR2 and SR3 and in this case there are two relative measurements as described between the levels BL1 and BL3, and BL2 and BL3. In the case of an image sensor having two output shift registers one relative measurement is required, the camera comprising one clamping circuit operating at a control voltage and one clamping circuit operating at a reference voltage.

An advantage of the relative measurement is the fact fact that the totality of mutual signal differences caused by signal processing at the output shift registers SR1, SR2 and SR3, the clamping circuits 2, 3 and 4 and the signal combination circuit 11 is corrected, because controlling is effective to a minimum measuring value. Refinements in the black level control may be performed, if desired or required in practice, dependent on the properties of the image sensor FTD. Examples of desired or required rafinements in the black level control are the use of the filter 13, the switching circuit 14 and the amplifier circuit 15 in FIG. 1, which usages may be effected singly or combined.

The low-pass filter 13 has, for example, a filter characteristic up to the order of one and a half times the clock pulse frequency FCP=3.75 MHz. The filter characteristic curve has a flat variation up to, for example, the frequency of 5.5 MHz whereafter the characteristic curve has a steeply decreasing variation. As a result harmonics of the clock pulse frequency of 3.75 MHz are prevented from occurring in a disturbing manner in the black level interference signal SB' of FIG. 2. In the case of a sufficient strength of these harmonics the phase measurement would be affected in a disturbing manner.

The use of the signal amplifier circuit 15 provides the advantage during measurement that an amplified, minimum interference signal is measured. The circuit 15 is formed with a signal limiter and a phase shifter which are shown for the purpose of illustration in the circuit 15 of FIG. 1 with a limiter characteristic curve and with ρ. When using the described image sensor FTD, a signal amplifier circuit 15 operating with a variable gain factor up to the order of 3000 and with a signal limitation up to approximately 0.3 V and a phase shift between approximately 30° and 60° of the clock pulse period is found to be satisfactory in practice in the black level control. The signal limitation and the phase shift may be important for the signal multiplication for a prevention of overdrive or a correction of signal phase differences caused by different signal channels. The black level interference signal SB' has then an optimum structure for performing the signal multiplication.

When the signal amplifier circuit 15 is used, it is important to avoid that this circuit is bottomed because of overdrive owing to signal peaks at its input. When the described image sensor FTD is used, voltage peaks of up to approximately 1 V may occur in the camera picture signal S123 during line and field blanking periods. Outside these periods the signal is present with an amplitude of 0.3 V between the black and the peak white value. To avoid bottoming of the amplifier circuit 15, the switching circuit 14 is provided in the camera of FIG. 1. While the black gating pulse signal BGP associated with the periodical dark current information is applied to the switching input 28, the switching circuit 14 is only conducting during the line period in which this information is present in the camera picture signal S123.

When the switching circuit 14 is used, the amplifier circuit 15 does not receive a signal outside the line period with the supply of the dark current information. As a result the circuit 15 will operate with its maximum gain factor as a noise source for the multiplier circuits 18 and 19. The switching circuits 22 and 23 which also only conduct during the line period with the dark current information under the control of the black gating pulse signal BGP also prevent the control voltages V1 and V2 from being influenced by the noise.

The signal black level clamping has been described in the foregoing, starting from the described image sensor formed with the shielding strip B shown. Unlike the embodiment shown, the strip B may be contiguous to the storage member M. In another case the shielding strip may be present at right angles to the line scan direction, whilst the signal black level clamping circuits described are not operative on the line time base described, but on a time base of pixel periods.

What is claimed is:

1. A camera, including a solid-state image sensor in the form of a charge transfer device comprising a pick-up member, a storage member and a parallel-in, series-out shift register member having at least two output shift registers each being coupled to a distinct sensor output terminal, said storage and shift register members being shielded from incident light and said pick-up member being shielded from incident light over a strip, the image sensor in said camera being operative under the control of a signal generator for supplying clock pulse signals for obtaining a picture signal having a periodical picture information associated with a scene to be recorded and a periodical dark current information originating from below the said strip and being associated with a signal black level, said picture signal being obtained after a picture information integration period in the pick-up member and a charge transfer period for the transfer between pick-up member and storage member, characterized in that of the sensor output terminals carrying the picture signals one output terminal is coupled via an associated clamping circuit operating at a reference voltage and at least one further output terminal is coupled via an associated clamping circuit operating at a control voltage to an input of a signal combination circuit having an output for the supply of a composite picture signal, which output is coupled to a first input of a signal multiplier circuit having a second input for the supply from the signal generator of the clock pulse signal which is associated with the output shift register which is coupled via the sensor output terminal to the clamping circuit operating at a control voltage, the output of the signal multiplier circuit being coupled to a control voltage input of the said clamping circuit operating at a control voltage via a switching circuit having a switching input for the supply of a black gating pulse signal associated with the periodical dark current information, and a subsequent signal storage circuit.

2. A camera as claimed in claim 1, characterized in that in the presence of an image sensor having three output shift registers the camera is provided with two clamping circuits operating at a control voltage whose control voltage inputs are each coupled to an associated signal multiplier circuit, switching circuit and signal storage circuit.

3. A camera as claimed in claim 1 or 2, characterized in that the output of the signal combination circuit is coupled to the first input of the signal multipler circuit via a low-pass filter having a filter characteristic of up to the order of one and a half times the clock pulse frequency of the clock pulse signal.

4. A camera as claimed in claim 3, characterized in that the output of the signal combination circuit is coupled to the first input of the signal multiplier circuit via a signal amplifier circuit having a signal limiter and a phase shifter.

5. A camera as claimed in claim 4, characterized in that the output of the signal combination circuit is coupled via a switching circuit to the signal amplifier circuit, said switching circuit having a switching input for the supply of the black gating pulse signal associated with the periodical dark current information.

6. A camera comprising:

a solid state charge transfer device image sensor having a pickup member, a storage member, and a parallel-in, series-out shift register member, said shift register member having at least a first shift register coupled to a first output terminal and a second shift register coupled to a second output terminal, said storage and shift register members being shielded from incident light, said pickup member having a strip which is shielded from incident light;

a signal generator for supplying clock pulse signals to the charge transfer device so that the charge transfer device produces first and second picture signals associated with different regions of a scene to be recorded, and so that the charge transfer device produces first and second black level signals associated with a dark current produced at different regions in the strip in the pickup member, the first picture signal and the first black level signal forming a first output signal at the first output terminal, and the second picture signal and the second black level signal forming a second output signal at the second output terminal;

means for combining the first and second picture signals into a single composite picture signal;

means for multiplying the second black level signal by a multiplication factor, said multiplication means producing a product signal;

means for shifting the second picture signal and the second black level signal in response to the product signal by an amount such that the second black level signal is substantially equal to the first black level signal.

7. A camera as claimed in claim 6, characterized in that the shifting means comprises a clamping circuit having a control voltage input, said control voltage input receiving the product signal from the multiplication means.

8. A camera as claimed in claim 7, characterized in that:

the clamping circuit receives the second output signal and produces a clamped second output signal;

the combining means combines the first output signal with the clamped second output signal to produce a composite output signal; and the multiplication means multiplies the second black level signal portion of the composite output signal.

9. A camera as claimed in claim 8, further comprising a signal storage circuit for receiving the product signal and for providing a stored product signal to the control voltage input of the clamping circuit.

* * * * *